May 29, 1945.　　A. C. SCHOEN　　2,376,941
SAW FILING DEVICE
Filed June 11, 1943　　5 Sheets-Sheet 3
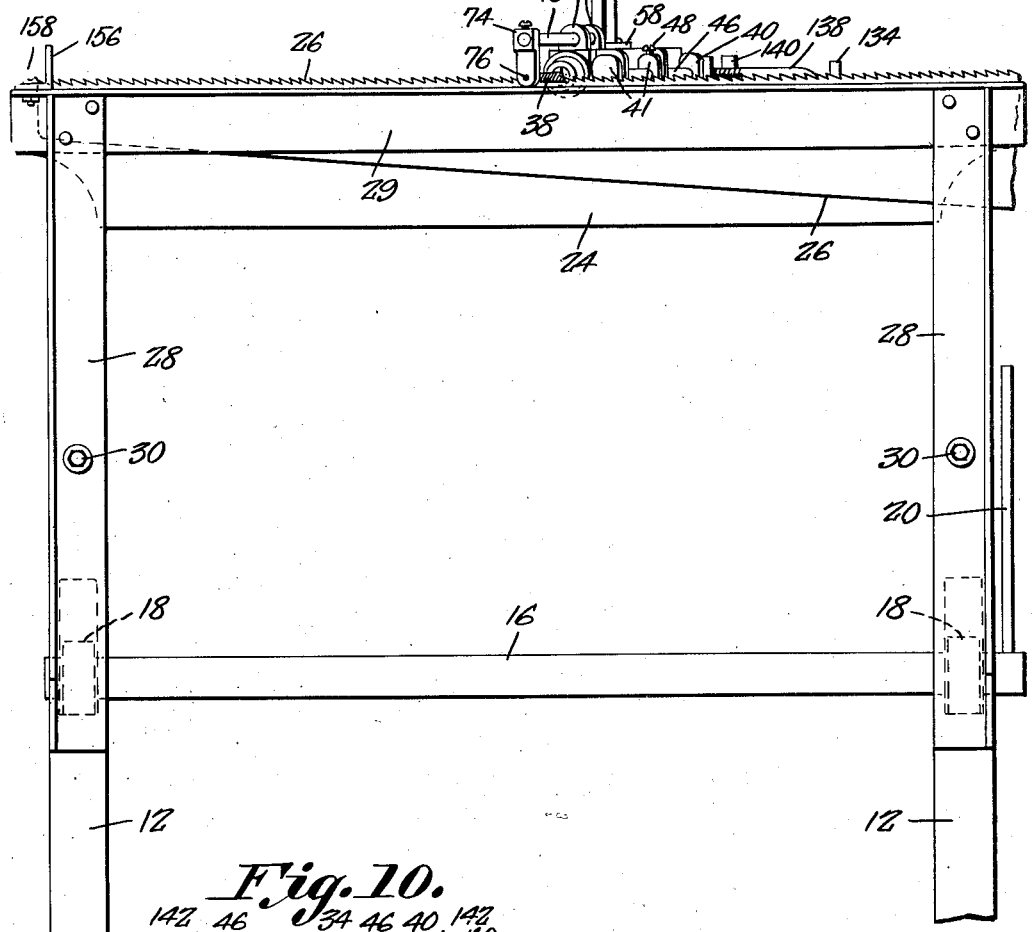
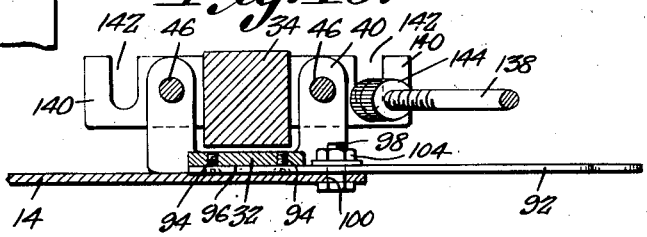
August C. Schoen,
INVENTOR.
BY
Victor J. Evans & Co.
ATTORNEYS May 29, 1945.  A. C. SCHOEN  2,376,941
SAW FILING DEVICE
Filed June 11, 1943  5 Sheets-Sheet 4

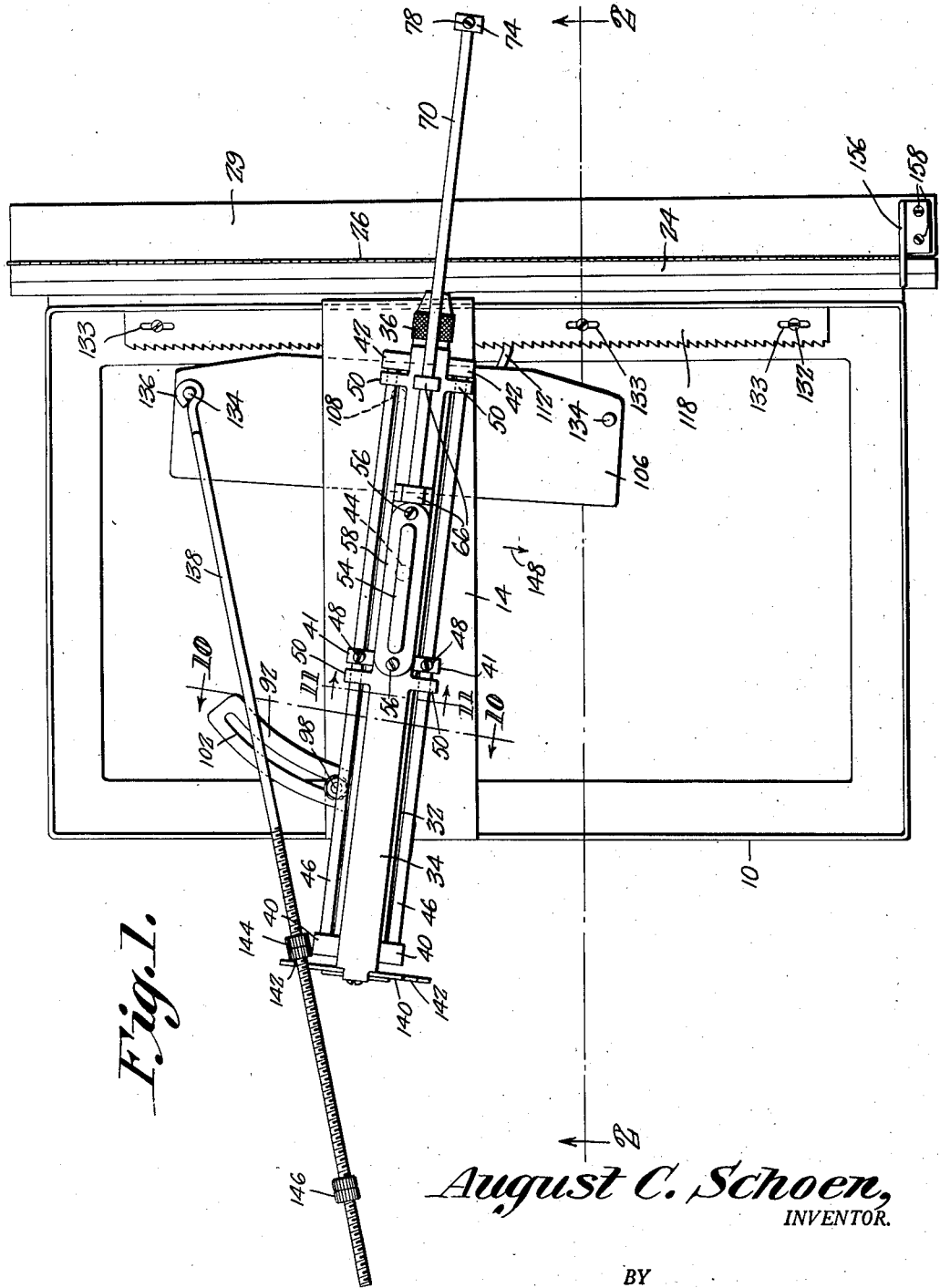

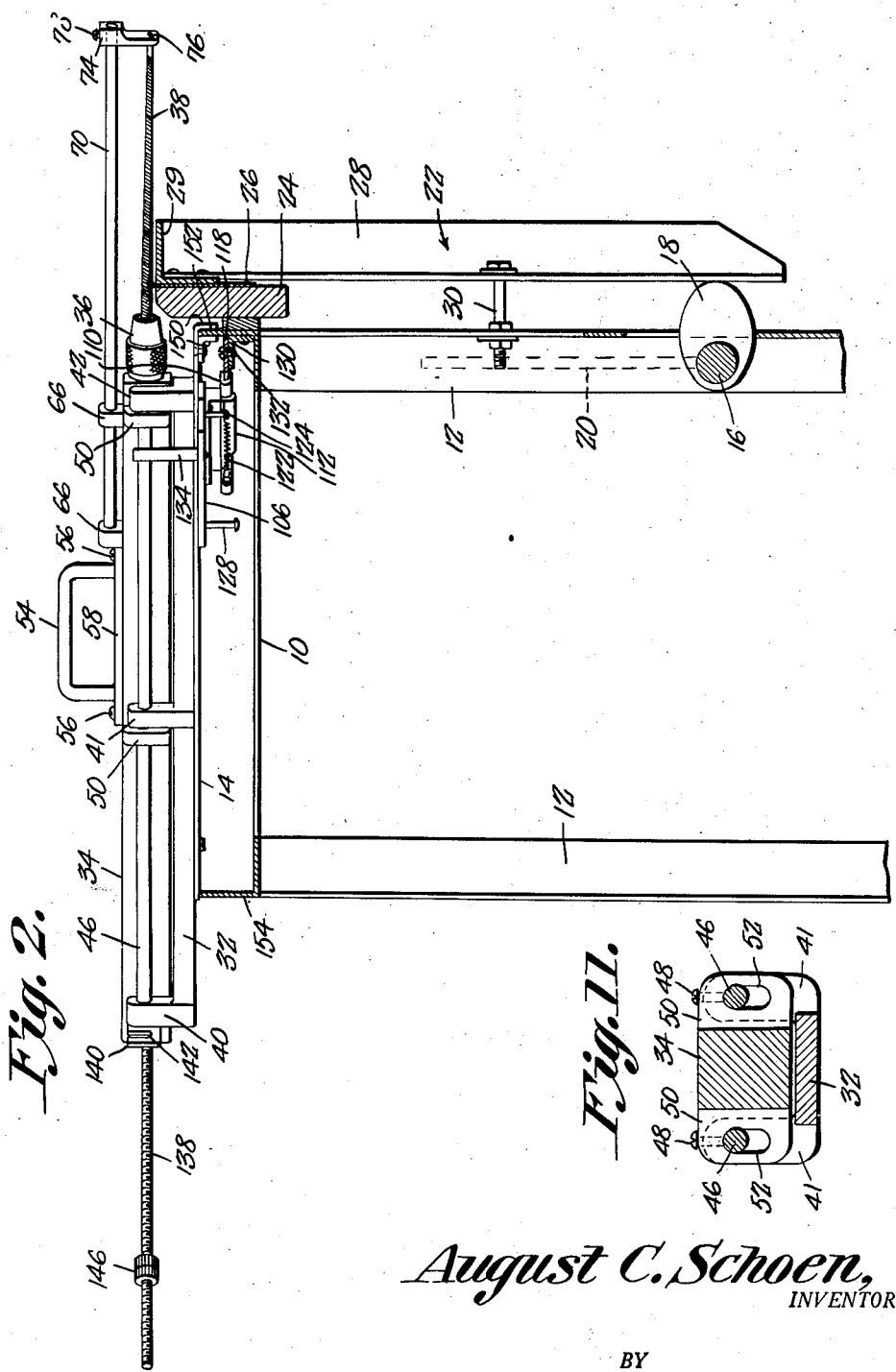

August C. Schoen,
INVENTOR.

BY
Victor J. Evans & Co.
ATTORNEYS

May 29, 1945. A. C. SCHOEN 2,376,941
SAW FILING DEVICE
Filed June 11, 1943 5 Sheets-Sheet 5
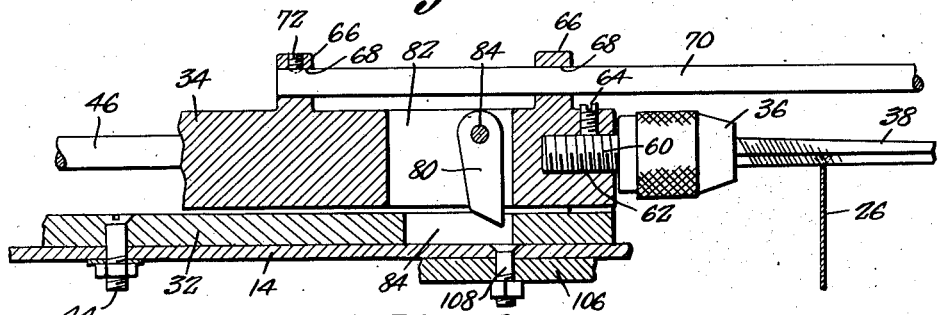
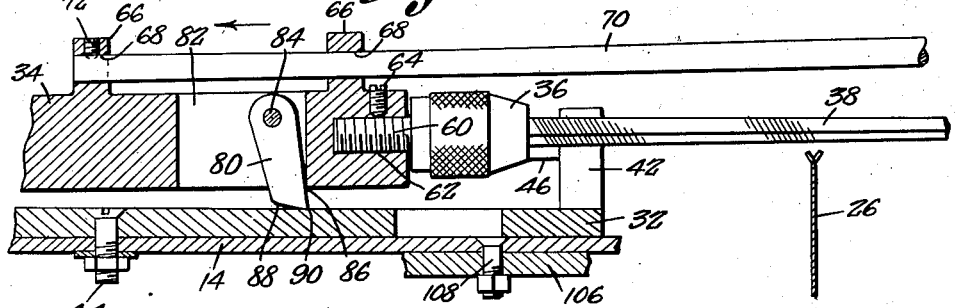
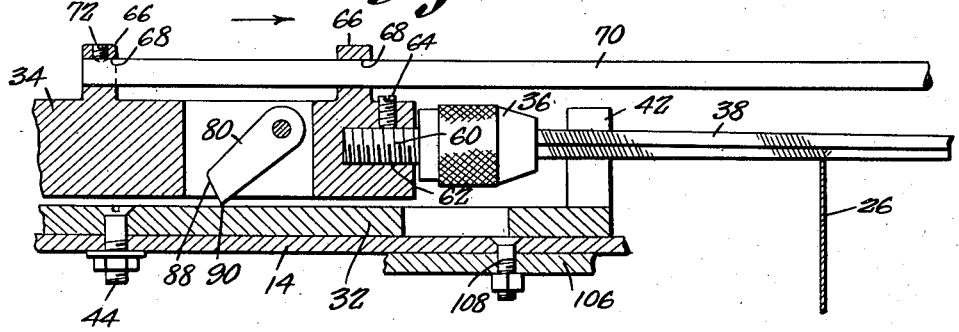
August C. Schoen,
INVENTOR.
BY
Victor J. Evans & Co.
ATTORNEYS Patented May 29, 1945

2,376,941

UNITED STATES PATENT OFFICE 2,376,941

SAW FILING DEVICE

August C. Schoen, Philadelphia, Pa.

Application June 11, 1943, Serial No. 490,510

6 Claims. (Cl. 76—33)

My invention relates to the art of sharpening saws, and has among its objects and advantages the provision of an improved saw filing device for hand saws and the like.

An object of my invention is to provide a saw filing device embodying a clamp for fixedly securing a hand saw, wherein novel means are incorporated for actuating the file at preselected angles with respect to the saw blade, and in which novel means are included for automatically shifting the file longitudinally of the saw blade to bring it in position for filing the next tooth.

Another object is to provide a saw filing device including means for guiding the file in a reciprocatory path for filing purposes, in which novel means are employed for elevating the file upon its return stroke, and in which a toothed member is associated with a ratchet mechanism for shifting the file from tooth to tooth, wherein the toothed member shifts the file in stages of two saw teeth at a time, with the toothed member detachably mounted to accommodate other toothed members of greater or less spacing for saws having different numbers of teeth per inch.

In the accompanying drawings:

Figure 1 is a top plan view of the invention;

Figure 2 is a view taken from the position indicated by line 2—2 of Figure 1;

Figure 3 is an end view of the device illustrating the greater portion of the saw blade clamp in position;

Figure 7 is a sectional view illustrating the saw lifting mechanism;

Figure 8 is a similar view illustrating the manner in which the file is elevated during the return stroke of the file;

Figure 9 is a similar view illustrating the manner in which the file is dropped upon the filing stroke;

Figure 10 is a sectional view along the line 10—10 of Figure 1; and

Figure 11 is a sectional view along the line 11—11 of Figure 1.

Figure 4:
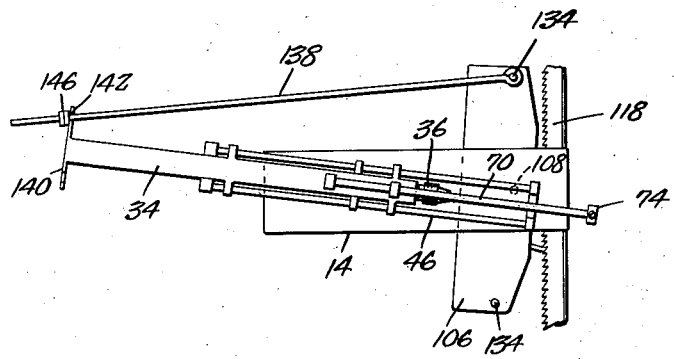
Figure 4 is a plan view of the ratchet mechanism.

In the embodiment selected for illustration, a frame 10 is welded to the upper ends of supporting legs 12, and the frame supports a bedplate 14 upon which the saw actuating mechanism is mounted. A shaft 16 is rotatably journaled in two of the legs 12 and is provided with two cams 18 and a crank arm 20, to facilitate rotation of the shaft and actuation of the cams. The cams operate a saw clamp member 22.

To the frame 10 is fixedly secured a bar 24, preferably of wood, which coacts with the clamp member 22 for fixedly securing the saw blade 26. Clamp member 22 comprises angles 28 interconnected at their upper ends by a cross angle 29 riveted thereto and located for engaging the saw blade 26 opposite the bar 24.

Bolts 30 are secured to two of the legs 12 and pass loosely through openings in the angles 28, with the angles so spaced from the axis of the shaft 16 as to cause the cams 18 to pivot the clamp member against the saw blade when the shaft is rotated in one direction.

Upon the bedplate 14 is mounted a bar 32 which serves as a track or guide for a chuck bar 34 provided with a chuck 36 at one end for supporting the file 38. Bar 32 is provided with three posts 40, 41 and 42 upon each side, with the chuck bar 34 located between the two sets of posts. The chuck bar slides longitudinally of the bar 32. Figures 7, 8 and 9 illustrate the bar 32 as being pivotally connected with the bedplate 14 through the medium of a bolt 44.

Each set of posts 40, 41 and 42 supports a rod 46, these bars being in parallelism and fixedly secured by means of set screws 48 threaded into the posts 41. Projecting laterally from the chuck bar 34 are four arms 50 slotted at 52 to receive the rods 46, see Figure 11. These slots are elongated vertically to permit vertical movement of the chuck bar 34 relatively to the rods 46, but the chuck bar is restrained from relative lateral movement by reason of the snug fitting relationship between the walls of the slots and rods.

Figures 1 and 2 illustrate a grip 54 secured to the chuck bar 34 through the medium of screws 56 passed through openings in a plate 58 and threaded into the chuck bar. Reciprocatory motion is imparted to the file 38 through manipulation of the grip 54. Figure 2 illustrates the position of the file 38 upon completion of its filing stroke, at which time two of the arms 50 engage the posts 42, respectively, to prevent further movement of the chuck bar. Engagement between the other two arms 50 and the posts 40, respectively, limit travel of the chuck bar in the opposite direction.

The chuck 36 includes a threaded shank 60 threaded into an axial bore 62 in the chuck bar 34, and a set screw 64 is threaded in the bar for fixedly securing the shank 60 against accidental rotation. Thus the shank may be turned to exactly position the file 38 with respect to saw needs and then made secure.

Two spaced ears 66 are formed on the chuck bar 34, both ears being bored at 68 to receive a rod 70 fixedly related to the ears by a set screw 72 threaded into one of the ears. To the outer end of the rod 70 is secured an arm 74, see Figure 2, which arm is provided with a small opening 76 into which the small end of the file 38 is inserted. This arm may be adjusted on the rod 70 and is fixedly secured thereto by a set screw 78. Thus the arm 74 affords support for the end of the file opposite the chuck 36.

Figures 7 and 9 illustrate the parallel relationship between the chuck bar 34 and the bar 32 during the filing stroke, while Figure 8 illustrates the chuck bar 34 in its angular position for elevating the file 38 clear of the saw 26 during the return stroke of the file. During the filing stroke, the chuck bar 34 is supported by the rods 46 through the medium of the arms 50. On the return stroke, the chuck bar 34 is supported at one end through engagement with the bar 32 and at its other end by a finger 80 arranged to ride on the bar 32.

A slot 82 is provided in the chuck bar 34 for loosely receiving the finger 80. This finger is pivoted at 84 and extends a short distance beneath the chuck bar 34. In the position of Figure 7, which illustrates the foremost position of the file 38, the finger 80 pivots into a slot 84 in the bar 32. The finger is located closely to one wall of the slot 82 so as to have engagement with the chuck bar 34, as at 86 in Figure 8, as the chuck bar 34 is moved rearwardly. The rounded end 88 of the finger 80 climbs easily when engaging the bar 32 for elevating the chuck bar 34. Thus the finger 80 is pivoted beyond a dead center position and is supported in that position through its engagement with the chuck bar 34 during the return stroke of the chuck bar. As the chuck bar is moved rearwardly to its extreme position and advanced forwardly, the finger 80 is pivoted to the position of Figure 9, which causes the finger to pivot beyond a dead center position and permit the chuck bar to drop to the position shown. A sharp edge 90 is provided on the finger 80 to eliminate slippage with respect to the bar 32 as the chuck bar 34 is advanced for the commencement of the filing stroke.

Since the bar 32 is pivoted on the bedplate 14, the file 38 may be adjusted to the desirable angle transversely of the saw 26. In Figures 1 and 10, a curved member 92 is secured to the bar 32 by screws 94, the bar 32 being provided with a transverse groove 96 to accommodate the member. A bolt 98 extends through an opening 100 in the bedplate and through a slot 102 in the member 92. Slot 102 has a curvature concentrically arranged with respect to the axis of the bolt 44, and the member 92 rests on the bedplate 14. Thus the bar 32 may be pivoted to different angular positions and made secure in the respective positions by merely tightening the nut 104 threaded on the bolt 98.

Figure 5:
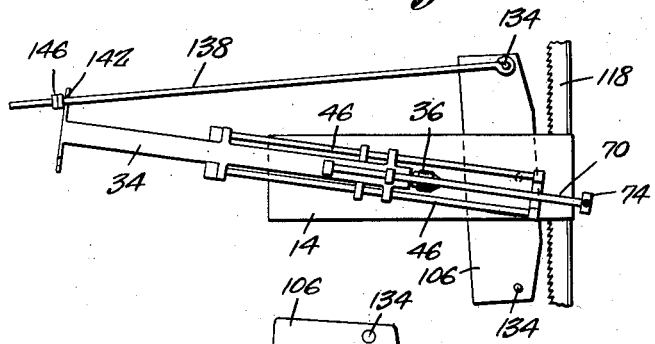
Figure 5 is a similar view illustrating the shifting action of the ratchet mechanism.
Figure 6:
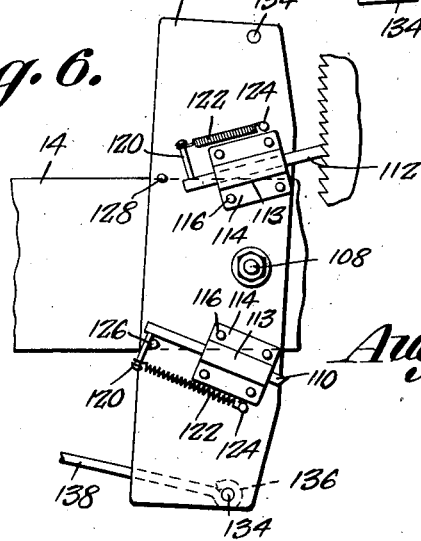
Figure 6 is a bottom plan view of the ratchet mechanism.

In Figures 4, 5 and 6, a ratchet plate 106 is positioned underneath and transversely of the bedplate 14. The ratchet plate is pivoted intermediate its ends to the bedplate 14, as by a bolt 108, best illustrated in Figure 9.

Ratchet pins 110 and 112 are slidably mounted in tubes 113 secured to the bottom face of the ratchet plate 106 through the medium of flanges 114 riveted at 116 to the ratchet plate. Each ratchet pin 110 and 112 is spring urged to bring its tapered end into yielding engagement with a toothed bar 118. Figures 4, 5 and 6 illustrate the pin 112 in engagement with the toothed bar 118 while the ratchet pin 110 is in its retracted position. Each of the ratchet pins is provided with a projection 120 connected with one end of a tension spring 122 having its other end secured at 124 to the ratchet plate 106. The projection 120 of the ratchet pin 110 is in engagement with a pin 126 fixed to the ratchet plate 106 for holding the ratchet pin in its retracted position. The projection may be moved out of engagement with the pin 126 through slight rotation of the ratchet pin 110. A similar pin 128 is provided for coaction with the projection 120 of the ratchet pin 112.

The toothed bar 118 is detachably mounted on an angle 130 riveted to the frame 10. Screws 132 extend through slots 133 in the toothed bar 118 and are threaded into the angle 130 for detachably mounting the toothed bar. All the teeth of the bar 118 are inclined in the same direction. The pitch of the teeth of the bar 118 is twice that of the saw teeth, and the bar is reversed for accommodating the two angular positions of the file 38 required to properly file a saw.

Two pins 134 are secured to the ratchet plate 106 near its ends for selective connection with the eye 136 of a ratchet rod 138. A plate 140 is secured to the rear end of the chuck bar 34 and is provided with slots 142 for selective reception of the ratchet rod 138. Figure 1 illustrates the ratchet rod 138 connected with one of the pins 134 and inserted in one of the slots 142, with the bar 32 in one of its angular positions, which properly aligns the file 38 with the saw blade 26. For the position of the file illustrated, the ratchet pin 112 is spring pressed against the toothed bar 118.

Stops 144 and 146 are threadedly secured on the ratchet rod 138, with the plate 140 positioned between the two stops. At this time, the bar 32 is fixed against pivotal movement about the axis of the bolt 44. The stop 144 is so located on the ratchet rod 138 as to be engaged by the plate 140 as the chuck bar 34 approaches its extreme forward position. Such engagement between the plate 140 and the stop 144 imparts clockwise rotation to the ratchet plate 106, which shifts the ratchet pin 112 laterally sufficiently far to drop into the space behind the next tooth on the bar 118. As the chuck bar 34 is moved in the rearward direction, the plate 140 is brought into engagement with the stop 146 as the chuck bar approaches its extreme rearward position. Such engagement between the plate 140 and the stop 146 exerts a pull on the ratchet rod 138 for imparting counter-clockwise rotation to the ratchet plate 106. Counter-clockwise rotation of the ratchet plate causes the ratchet plate to advance relatively on the ratchet pin, which imparts slight pivotal movement to the ratchet pin, with the point of engagement of the ratchet pin with the toothed bar 118 constituting the pivotal axis of the pin. Both the ratchet pins 110 and 112 are arranged in diverging relationship with respect to the axis of the bedplate 14. Because of this angularity, forced retraction of the ratchet pin 112 in Figure 1 through counter-clockwise rotation of the ratchet plate 106 exerts a lateral shift to the bedplate 14 in the direction of the arrow 148.

Continued reciprocation of the chuck bar 34, when adjusted according to Figure 1, shifts the bedplate 14 one tooth at a time with respect to the toothed bar 118, which spacing intervals equal two saw teeth spaces. The toothed bar 118 is sufficiently long to accommodate the ordinary hand saw blade. Upon completion of one filing action, the toothed bar 118 is reversed so that the teeth of the bar will be angled in the opposite direction. The bar 32 is pivoted to its other angular position, and the eye 136 of the ratchet rod 138 is inserted over the other pin 134. The ratchet rod is also slipped into the other slot 142, and the ratchet pin 112 is secured in its retracted position and the ratchet pin 110 is released for coaction with the toothed bar 118. Thus the bedplate 14 is moved laterally in the opposite direction for completing the final filing action. Since the spacing intervals are equal in both directions of lateral shift, the file 38 is merely positioned between two unfiled valleys in the saw blade so that the lateral shift of the bedplate 14 in the opposite direction will properly space the file 38 with respect to the unfiled valleys of the saw blade.

The slots 133 permit the toothed bar 118 to be precisely adjusted so as to accurately time the ratchet mechanism, particularly the file, with respect to the saw teeth. To accommodate saws having different numbers of teeth per inch, a series of toothed bars is provided for the respective types of saws. In addition, a ratchet rod 138 and stops 144 and 146 are provided for each of the toothed bars employed so that the ratchet mechanism may be operated in accordance with the particular toothed bar in the machine. The stops 144 and 146 on each rod 138 are set to actuate the ratchet mechanism in accordance with the particular toothed bar to the end that the ratchet mechanism may be accurately adjusted to the type of saw being handled.

Referring to Figure 2, the bedplate 14 is provided with two spaced flanges 150 which slidably embrace the flange 152 of the frame 10. Thus the bedplate 14 is accurately guided during lateral shifting thereof in either direction. The opposite end of the bedplate rests on the flange 154 of the frame 10.

In order to facilitate placement of the saw 26 in the vise structure, particularly with respect to elevation in relation to the file 38, a blade 156 is provided. This blade is secured to the angle 28 by screws 158. The blade 156 is positioned in a notch in the saw adjacent one end thereof for determining the height of the saw at that end. It is then a relatively easy matter for the operator to visually gage the elevation of the saw at the other end of the vise, since the blade 156 constitutes a fulcrum for the saw blade which aids the operator in manipulating the saw to its proper position.

Without further elaboration, the foregoing will so fully illustrate my invention, that others may, by applying current knowledge, readily adapt the same for use under various conditions of service.

I claim:

1. A saw filing device comprising a support, a saw clamp on said support, a toothed bar paralleling the saw in said clamp and fixed on said support, a bed-plate guided on said support for movement longitudinally of said toothed bar, a reciprocatory file support for supporting the file transversely of the saw, track means carried on said bedplate for guiding said file support, a ratchet plate pivoted on said bedplate, a ratchet pin movably mounted on said ratchet plate and yieldingly urged against the teeth on the toothed bar, said ratchet pin being obliquely aligned with respect to said toothed bar, and a ratchet rod pivotally connected with said ratchet plate and having a lost motion connection with said file support for pivoting the ratchet plate in a first direction upon completion of the filing stroke of the file support and in a reverse direction upon completion of the file retraction stroke of said file support, said ratchet pin being shifted one tooth at a time with respect to said toothed bar by the pivotal movement of the ratchet plate in said first direction and acting thereon to shift said bedplate longitudinally of the toothed bar and the file two saw teeth upon pivotal movement of the ratchet plate in said reverse direction.

2. A saw filing device comprising a support, a saw clamp on said support, a toothed bar paralleling the saw in said clamp and fixed on said support, a bedplate guided on said support for movement longitudinally of said toother bar, a reciprocatory file support for supporting the file transversely of the saw, track means carried on said bedplate for guiding said file support, a ratchet plate pivoted on said bedplate, a ratchet pin movably mounted on said ratchet plate and yieldingly urged against the teeth on the toothed bar, said ratchet pin being obliquely aligned with respect to said toothed bar, a ratchet rod pivotally connected with said ratchet plate and having a lost motion connection with said file support for pivoting the ratchet plate in a first direction upon completion of the filing stroke of the file support and in a reverse direction upon completion of the file retraction stroke of said file support, said ratchet pin being shifted one tooth at a time with respect to said toothed bar by the pivotal movement of the ratchet plate in said first direction and acting thereon to shift said bedplate longitudinally of the toothed bar and the file two saw teeth upon pivotal movement of the ratchet plate in said reverse direction, and means acting on said track means and said file support for elevating the latter to lift the file clear of the saw during the file retraction stroke of the file support and for dropping the file support upon reverse movement of the file support to bring the file into engagement with the saw.

3. A saw filing device comprising a support, a saw clamp on said support, a toothed bar paralleling the saw in said clamp and fixed on said support, a bedplate guided on said support for movement longitudinally of said toothed bar, a reciprocatory file support for supporting the file transversely of the saw, track means carried on said bedplate for guiding said file support, a ratchet plate pivoted on said bedplate, a ratchet pin movably mounted on said ratchet plate and yieldingly urged against the teeth on the toothed bar, said ratchet pin being obliquely aligned with respect to said toothed bar, a ratchet rod pivotally connected with said ratchet plate and having a lost motion connection with said file support for pivoting the ratchet plate in a first direction upon completion of the filing stroke of the file support and in a reverse direction upon completion of the file retraction stroke of said file support, said ratchet pin being shifted one tooth at a time with respect to said toothed bar by the pivotal movement of the ratchet plate in said first direction and acting thereon to shift said bedplate longitudinally of the toothed bar and the file two saw teeth upon pivotal movement of the ratchet plate in said reverse direction, means acting on said track means and said file support for elevating the latter to lift the file clear of the saw during the file retraction stroke of the file support and for dropping the file support upon reverse movement of the file support to bring the file into engagement with the saw, said track means beig pivotally mounted on said bedplate, means for fixedly securing the track means in different angular positions on said bedplate, said toothed bar having teeth inclined in one direction, a second ratchet pin on said ratchet plate and obliquely aligned with respect to the toothed bar, said toothed bar being reversible to oppositely incline the teeth thereon for coaction with said second ratchet pin, and means on said file support for operatively connecting the ratchet rod therewith when said second ratchet pin is active, said ratchet rod having a second pivotal connection with the ratchet plate when the second ratchet pin is active.

4. The invention as described in claim 3 wherein the means for elevating said file support comprises a pivoted pin moveable on one direction for acting on said track means.

5. The invention as described in claim 3 wherein the means for operatively connecting the ratchet rod with said file support comprises a plate extending transversely of said support and provided with slots for recovering the ends of said ratchet rod.

6. The invention as described in claim 3 wherein said ratchet rod is provided with stops for operation with said toothed bar in order that said ratchet mechanism can be adjusted for different types of saws.

AUGUST C. SCHOEN.